United States Patent [19]
Morimatsu

[11] 3,930,422
[45] Jan. 6, 1976

[54] POWER TRANSMISSION APPARATUS
[75] Inventor: Yoshihiro Morimatsu, Kawasaki, Japan
[73] Assignee: Fuji Electric Company Ltd., Kawasaki, Japan
[22] Filed: July 24, 1974
[21] Appl. No.: 491,573

[30] Foreign Application Priority Data
| July 25, 1973 | Japan | 48-83830 |
| Apr. 3, 1974 | Japan | 49-37649 |
| June 10, 1974 | Japan | 49-65827 |
| June 10, 1974 | Japan | 49-65828 |

[52] U.S. Cl. .............. 74/625; 64/29; 74/670; 192/95
[51] Int. Cl.² ........................................ F16D 7/06
[58] Field of Search ............... 74/625, 670; 64/29; 192/95

[56] References Cited
UNITED STATES PATENTS
| 2,683,362 | 7/1954 | Bowman | 64/29 |
| 2,772,578 | 12/1956 | Kling | 74/625 |
| 3,515,250 | 6/1970 | Canatalupo | 74/625 |
| 3,722,644 | 3/1973 | Steinhagen | 64/29 |
| 3,873,069 | 3/1975 | Sprague | 74/625 |

Primary Examiner—Kenneth W. Sprague
Attorney, Agent, or Firm—Sughrue, Rothwell, Mion Zinn & Macpeak

[57] ABSTRACT

A power transmission apparatus is disclosed in which a power output shaft is connected to both a manual input means and a power input means. Means are provided to automatically disengage the power input upon actuation of the manual input. Alternative embodiments disclose means to prevent rotation of the manual input handle during engagement of the power input means.

2 Claims, 12 Drawing Figures

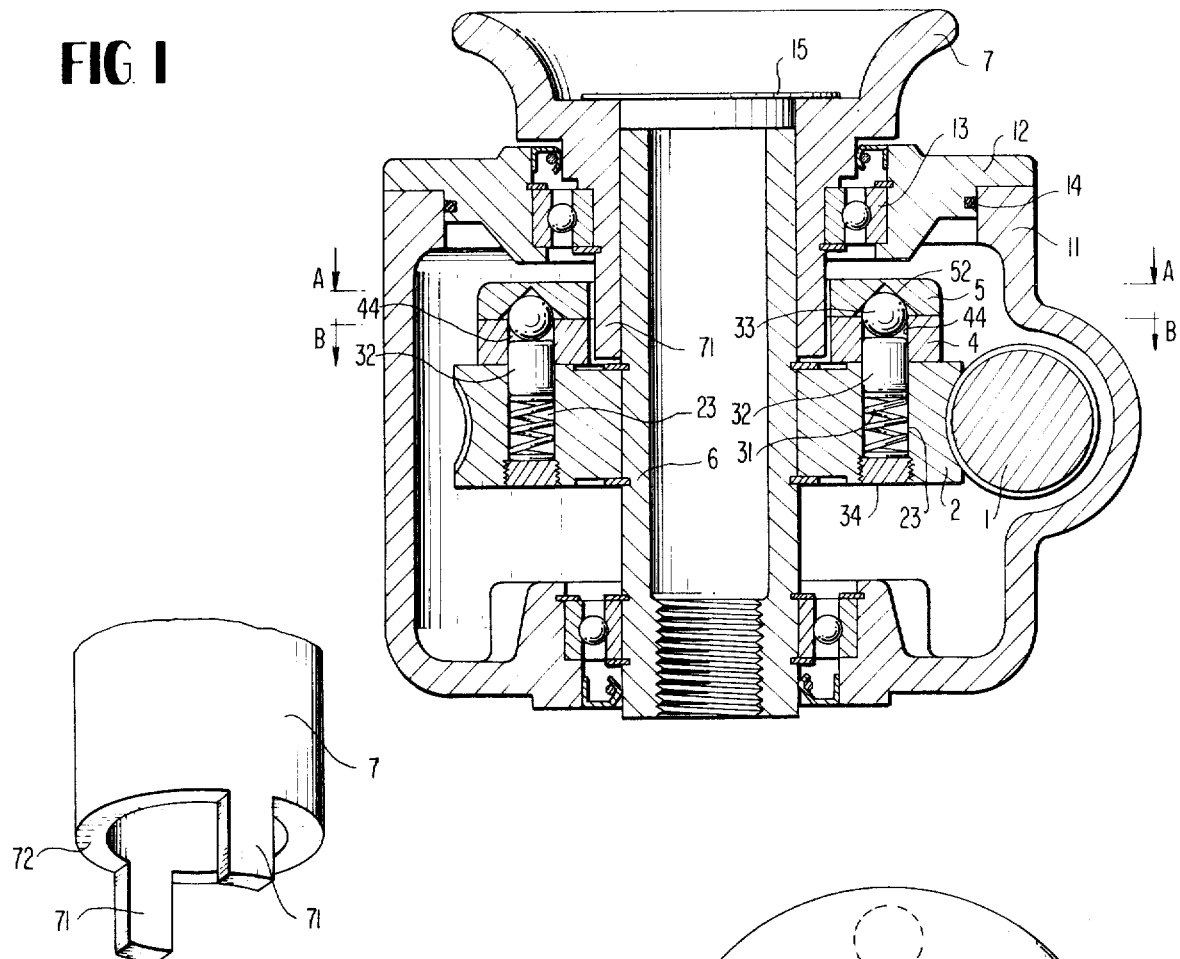
FIG. 1
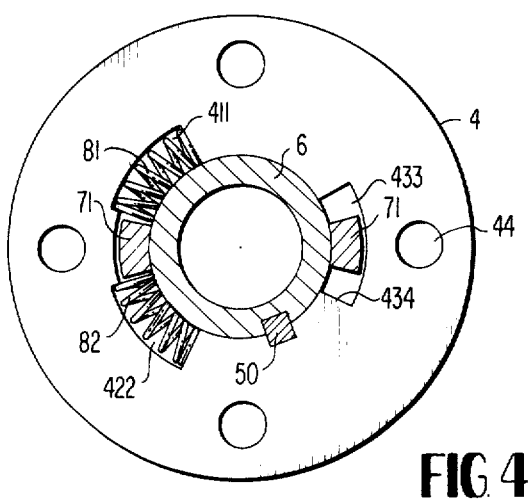
FIG. 2
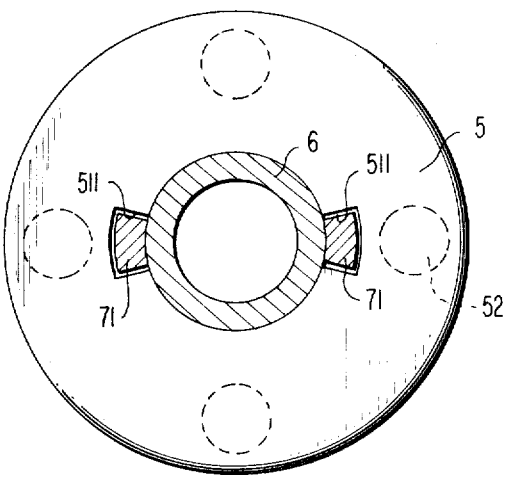
FIG. 3
FIG. 4

POWER TRANSMISSION APPARATUS

BACKGROUND OF THE INVENTION

1. Field of the Invention

This invention relates to a power transmission apparatus comprising two control systems for transmitting power to the power shaft connected to a load shaft, one of the two systems being an automatic control system for transmitting power from a motor and the other being a manual control system for manually transmitting power, wherein the power transmission through the manual control system precedes that through the automatic control system and the power transmission through said manual control system can be automatically switched, when it is stopped, to that through the automatic control system.

2. Description of the Prior Art

Most of the conventional apparatus of this type are provided with automatic-manual switching mechanisms for determining whether to transmit the power to the power shaft either through the automatic control system or through manual control system. However, the apparatus provided with such automatic-manual switching mechanisms are likely to result in mis-switching action by an unexpected external force applied thereto. In order to prevent the accidents that may be caused by such mis-switching operations, a power transmission apparatus has been proposed which transmits the power to the power shaft through either of the automatic or manual control without utilizing the automatic-manual switching mechanisms (for instance, Japanese Pat. No. 605,743). Such apparatus, however, have extremely complicated structures, require high accuracy in the fabrication and are, consequently, expensive.

SUMMARY OF THE INVENTION

An object of this invention is, therefore, to provide an apparatus which has a simple structure and is easy to operate wherein the power transmission mode can be selected between the power source to the power shaft through the automatic control system and the manual control system without employing the automatic-manual switching mechanism, and the power transmission through the manual control system can be performed preceding to the power transmission through the automatic control system.

Another object of this invention is to provide a power transmission apparatus wherein, during the power transmission through the automatic operation system to the power shaft, the manual control system can remain still without being affected thereby.

A further object of this invention is to provide a power transmission apparatus which can detect an overload applied to the power shaft during the power transmission through the automatic control system to the power shaft.

DESCRIPTION OF THE ACCOMPANYING DRAWINGS

This invention will now further be described in detail by way of the preferred embodiments thereof referring to the accompanying drawing wherein:

FIG. 1 is a vertical section of one embodiment of this invention;

FIG. 2 is a perspective view of a lower portion of a handle used in the embodiment shown in FIG. 1;

FIG. 3 and FIG. 4 are transverse cross sections taken along the lines A—A and B—B respectively shown in FIG. 1;

FIG. 8 is a vertical section of a third embodiment of this invention;

PREFERRED EMBODIMENTS

Figure 5:
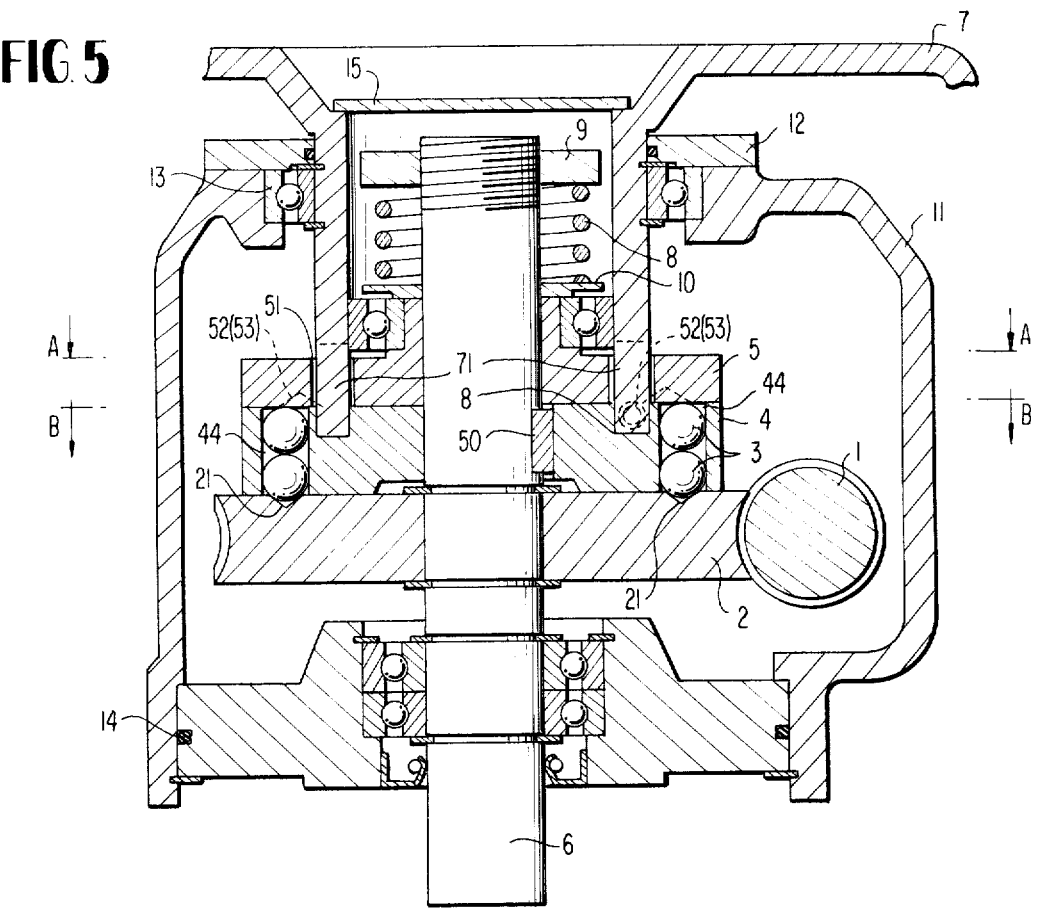
FIG. 5 is a vertical section of a second embodiment of this invention.

In FIG. 1, a worm gear 1 connected to a driving power source such as an electric motor is coupled to a portion of the outer periphery of a worm gear 2 which is rotatably supported on a power shaft 6 held in case 11. A holder 4 having cylindrical apertures 44 containing steel balls 33 at four locations thereof as best shown in FIG. 4 is provided laying over the upper side of the gear 2 and fixed to the power shaft 6 by way of a key 50. Cylindrical rollers 32 which are movable in the apertures 44 of the holder 4 are inserted into cylindrical apertures 23 of the worm gear 2, and a compression spring 31 and a screw 34 for adjusting the resilience of said spring 31 are also inserted in said apertures 23. Notches 411, 422 and 433 are cut through said holder 4 and springs 81 and 82 are held in said notches 411 and 422 respectively as shown in FIG. 4. Laying over said holder 4, a disc 5 is provided which is rotatable with respect to the power shaft 6. Disc 5 has conical recesses 52 capable of receiving the steel balls 33 contained in the cylindrical apertures 44 of said holder 4. The steel balls 33 contained within the cylindrical apertures 44 of said holder 4 have a diameter equal to the size as that of the thickness of the holder 4.

Handle 7 is rotatably supported on the power shaft 6 over the disc 5 and it has a pair of projections 71 opposing each other and, provided on its hollow lower end 72 as show in FIG. 2. Said projections 71 are passed through the notches 511 in the disc 5 beneath the handle 7 and inserted into a portion between the notches 411 and 422 and into the notch 433. 12 denotes a lid, 13 is a bearing, 14 is an O-ring seal and 15 is a cover plate.

In this embodiment, the driving power can be transmitted to the power shaft by selecting either the automatic control system driven by an electric motor and the like or a manual control system actuated by operation of the handle. Precedence can be given to the power transmission through the manual control system rather than through the automatic control system. The automatic control system can be automatically restored when the power transmission through the manual control system is stopped.

During the time that the power is transmitted to the power shaft 6 through the automatic control system, each of the mechanism described above takes the state as shown in FIG. 1, where a cylindrical roller 32 overrides the worm gear 2 and the holder 4 and the steel ball 33 overrides the holder 4 and the disc 5 under the compressive force of the spring 31. Accordingly, the driving power from the worm gear 1 connected to the motor and the like (not shown) is transmitted by way of the worm gear 2, cylindrical roller 32, holder 4, and key 50. Since the holder 4 and disc 5 are coupled by the steel ball 33 to rotate the disc 5, the cylindrical roller 32 is not pushed completely into the cylindrical hole 23 of the worm gear 2. The handle 7 is also rotated by way of the projections 71 passing through the notches 511 in the disc 5.

During the power transmission through the automatic control system to the power shaft, the precedence can be given to the power tranmission through the manual control system by way of the handle operation rather than that through the automatic operation system as described below.

When the handle 7 is turned forcedly, its projections 71 rotate the disc 5 causing the steel balls 33 within the conical holes 52 of the disc 5 to move downward. When the steel balls 33 are completely pushed into the cylindrical apertures 44 of the holder 4, the engagement between the disc 5 and the holder 4 by the steel balls 33 is lost. At the same time, as shown in FIG. 4, the projection 71 of the handle 7 inserted at an intermediate position of the notches 411 and 422 of the holder 4 is moved by the turning of the handle 7 while compressing the either of the compression spring 81 or 82. Whether the spring 81 or the spring 82 is compressed is determined depending upon the particular turning directions. At the time when the engagement between the holder 4 and the disc 5 is lost as described above and the cylindrical apertures 44 in the holder 4 and the conical holes 52 of the disc 5 are completely out of the alignment, the projection 71 of the handle 7 inserted in the notch 433 in the holder 4 comes to contact the end face 434 thereof. Therefore, by further turning the handle 7, the power is transmitted through the projection 71 of the handle 7, holder 4 comprising the end face 434 of the notch 433 and the key 50 to the power shaft 6.

The worm gear 2 continues idle rotation while having no effect on the holder 4 at the operation of the handle 7, because the steel balls 33 having the diameter of the same size as that of the thickness of the holder 4 and completely contained within the cylindrical apertures 44 push the cylindrical rollers 32 into the cylindrical apertures 23 in the worm gear 2 and, as the result, the engagement between the worm gear 2 and the holder 4 is eliminated.

When the handle operation is stopped, the power transmission through the automatic control system to the power shaft is automatically restored in the manner described below. When the handle operation is stopped, that is, the turning force applied on the handle 7 is removed, the projection 71 of the handle 7 is pushed back to the intermediate position between the notches 411 and 422 by either of the compression spring 81 or 82 that was compressed within said notches 411 or 422. The movement of the projection 71 results in the movement of the disc 5, and the conical holes 52 in the disc 5 arrive at the positions corresponding to those of the cylindrical paertures 44 in the holder 4. This makes it possible for the steel balls 33 within the cylindrical apertures 44 to move upward. Then, the steel balls 33 are pushed upward by way of the cylindrical rollers 32 by the force of the springs 31 located in the cylindrical apertures 23, and they are received in the conical holes 52 of the disc 5. Thus, the cylindrical rollers 32 come to override the worm gear 2 and the holder 4 to combine again the gear 2 and the holder 4 thereby enabling the power transmission through the automatic control system in the manner as described above.

It is impossible in the foregoing embodiment of this invention to detect the overload applied on the power shaft 6. Another embodiment of this invention capable of detecting such overload will now be described.

Figure 6:
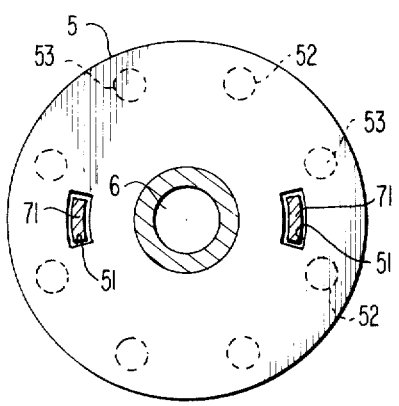
FIG. 6 and FIG. 7 are transverse cross sections taken along the lines A—A and B—B respectively shown in FIG. 5.

In FIG. 5, a worm gear 2 is shown to be rotatably retained on the power shaft 6 and has recesses such as conical holes 21 on the side opposing the holder 4 at the position corresponding to the cylindrical apertures 23 in the previous embodiment. The conical holes 21 are provided at the four positions near the periphery of the worm gear 2 and the size capable of containing a portion of steel balls 3 contained in the cylindrical apertures 44 in the holder 4. The two steel balls 3 are designed so that they can move in the cylindrical apertures 44 and the sum of their diameters is larger than the thickness of the holder 4. The holder 4 is provided with slots 41 and 42 different to each other in length and corresponding to the notches 411, 422 and 433 in the holder 4 of the previous embodiment as specifically illustrated in the FIG. 7. One of the slots, slot 41, has inserted therein compression springs 81, 82 having the same spring force. The disc 5 rotatably held on the power shaft 6 is provided with recesses such as conical holes 52, 53 each at four positions to which the steel balls 3 contained in the cylindrical apertures 44 in the holder 4 can be received, as shown in FIG. 6. The conical holes 52, 53 have the same size as that of the conical holes in the worm wheel 2. Apertures 51 are cut through the disc 5 at the positions corresponding to those of the slots 41, 42 in said holder 4. The projections 71 at the lower end of the handle 7 rotatably held in the case 11 pass through the apertures 51 and extend as far as the slots 41 and 42 in the holder 4, one of them being inserted at an intermediate position between the compression springs 81 and 82. A torque spring 8 is inserted between the spring holders 9 and 10 and the resilience of the spring 8 is previously set by way of the spring holder 9 which is adjustable.

The normal operation of this embodiment and the overload detection function thereof during the power transmission to the power shaft by way of the automatic system are to be described below.

Figure 7:
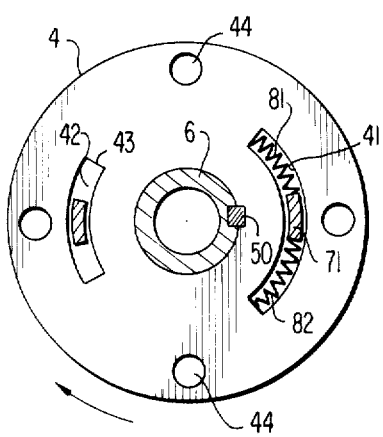

When the power is transmitted to the power shaft 6 through the automatic control system, each of the mechanisms takes the state as shown in FIG. 5 through FIG. 7, wherein the conical holes 21 in the worm gear 2 and the cylindrical apertures 44 in the holder 4 are in the aligning positions and the cylindrical apertures 44 in the holder 4 situate at the intermediate positions between each of the adjacent conical holes 52 and 53 in the disc 5. The steel balls 3 within the cylindrical apertures 44 in the holder 4 are thereby pushed downward by the disc into engagement with the conical holes 21 in the worm gear 2 to accomplish the connection between the worm gear 2 and the holder 4. The projection 71 of the handle 7 is maintained at an intermediate position between the compression springs 81 and 82. As apparent from the foregoing, the power from the electric motor, etc. is transmitted by way of the worm gear 1, worm gear 2, steel balls 3, holder 4 and key 50 to the power shaft 6 to rotate said power shaft 6. Since the rotation of the holder 4 causes the handle 7 to rotate by the projection 71 inserted within the slot 41 and the rotation of the handle 7 rotates, in turn, the disc 5, none of the cylindrical apertures 44 in the holder 4 and the conical holes 52 and 53 in the disc 5 align with each other during power transmission through the automatic control system.

The operation of this embodiment at the time when the overload is applied on the power shaft while the power shaft is being rotated by way of the motor and the like is described below. It is assumed that some overload is applied on the power shaft 6 while the shaft is rotated by way of the motor, etc. and the rotation of the power shaft is stopped thereby. When the power shaft 6 is stopped by the application of the overload, it causes the holder 4 to stop by way of the key 50. Since the worm gear 2 continues to rotate if the power shaft is stopped by the application of the overload, the steel balls 3 in the cylindrical apertures 44 in the holder 4 moves upward out of the conical holes 21 in the worm gear 2, which makes the disc 5 move upward against the predetermined compression resilience of the torque spring 8. The detection of the upward movement of this disc 5 to stop the motor can be accomplished by various devices conventionally employed, for example, by providing a torque detection lever and actuating the switching mechanism, etc. through the operation of this detection lever.

The function of giving the precedence to the power transmission through the manual control system rather than the power transmission through the automatic control system by way of the handle operation during the time when the power transmission is performed to the power shaft through the automatic control system is described below.

When two projections 71 of the handle 7 are rotated, by the forced turning of the handle 7, the disc 5 is rotated in the direction, for instance, of an arrow shown in FIG. 7 and the handle projection 71 compresses the compression spring 82 held within the slot 41 in the holder 4. By further turning the handle 7, conical holes provided at the four positions on the disc 5, for example holes 52, come into alignment with the cylindrical apertures 44 in the holder 4, which enables the steel balls 3 within the cylindrical apertures 44 to move up and down. When the steel balls 33 are enabled to move up and down in the cylindrical apertures 44, the projection 71 inserted within the slot 42 in the holder comes to contact the end face 43 of the slot 42 in the holder 4 to transmit the power from the handle 7 to the holder 4. Accordingly, the turning of the handle 7 transmits its power through the projection 71 of the handle 7, holder 4 having the slot 42 and the key 50 to the power shaft 6. In this state, as the rotation speeds of the holder and the worm wheel differ, the steel balls 3 move upward in the cylindrical apertures 44 leaving the conical holes 21 in the worm gear 2 and are pushed into the conical holes 52 in the disc 5. Thus, the coupling between the holder 4 and the worm gear 2 by the steel balls 3 is eliminated to put the worm gear 2 into idle rotation and put the manual control system completely out of the effects of the power from the automatic control system.

As apparent from the foregoing, the size of the slot 42 in the holder 4 is so designed that the projection 71 of the handle 7 does not contact the end face 43 of the slot 42 until the conical holes 52 in the disc 5 and the cylindrical apertures 44 in the holder 4 come to align by turning the handle and the steel balls 3 contained in the cylindrical apertures 44 are received in the conical holes 52 in the disc 5. It is determined depending on the particular rotation directions of the power shaft 6 whether the compression spring 81 or 82 in the slots 41 of the holder is compressed, and which of the conical holes 52 and 53 provided on the disc 5 respectively on the both sides of the positions corresponding to the cylindrical apertures 44 in the holder 4 align said apertures 44.

The power is thus transmitted to the power shaft 6 by the operation of the handle 7. Descriptions are now to be made on the function that the operation of the automatic control system is automatically restored when the operation of the handle 7 is stopped and the power transmission is switched to that of the automatic control system.

Figure 3:
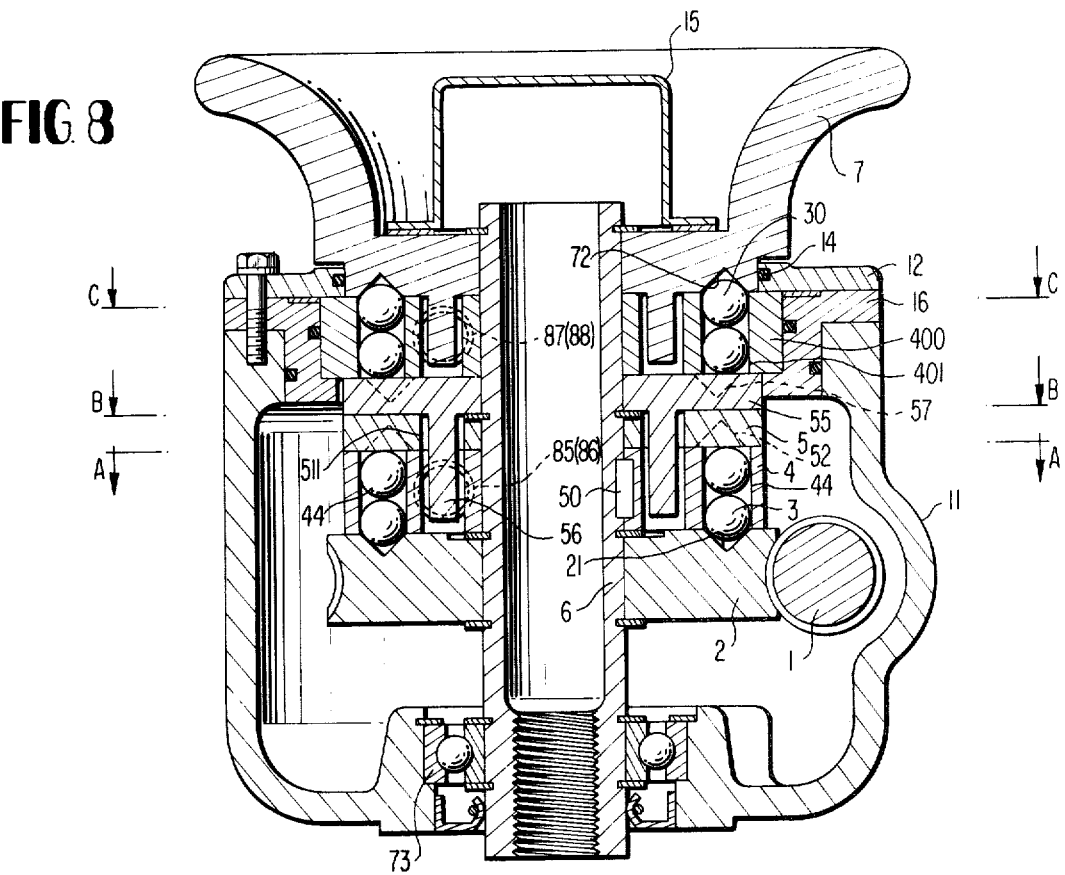

When the operation of the handle 7 is stopped, the projection 71 of the handle 7 is exerted in the slot 41 with the resilience force to return it to the intermediate position in the slot 41, that is, the position shown in FIG. 3 by the compression spring 82 held in the slot 41 in the holder 4. two different conditions are conceivable then, that is, where the conical holes 21 in the worm gear 2 are aligned with positions corresponding to those of the cylindrical apertures 44 in the holder and where they are not. When the cylindrical apertures 44 and the conical holes align, the steel balls 3 contained within the cylindrical apertures 44 in the holder 4 move downward since the disc 5 is applied with the force of rotation from the compression spring 82 by way of the projection 71 of the handle 7. The connection between the disc 5 and the holder 4 formed by the steel balls 3 is thereby disengaged, the projection 71 of the handle 7 is returned to its intermediate position by the compression spring 82 in the slot 41, and the disc 5 is rotated simultaneously to the location where its conical holes 52 no longer align with the cylindrical apertures 44 in the holder 4. The steel balls 3 move downward at this time through the cylindrical apertures 44 in the holder 4 are received in the conical holes 21 of the worm gear 2 to connect the holder 4 and the worm gear 2. Where the cylindrical apertures 44 in the holder 4 and the conical holes 21 in the worm gear 2 are not aligned at the time of stopping the handle operation, the disc 5 continues to keep its previous state since the holder 4 and the disc 5 are connected by way of the steel balls 3. Thereafter, when the conical holes 21 arrive at the positions corresponding to those of the cylindrical apertures 44 in the holder 4 with the rotation of the worm gear 2, the steel balls 3 contained in the cylindrical apertures 44 are pressed and moved downward by the disc 5 as described above.

In each of the foregoing embodiments, the power can be transmitted to the power shaft through either the manual or the automatic control system without utilizing a switching lever mechanism of the prior art and the structure thereof is simplified. However, in those embodiments, the handle of the manual control system is also turned during the power transmission through the automatic control system to the power shaft. It is conveivable in such embodiments that when the rotation of the handle is stopped by some unexpected external force, the power transmission through the automatic control system may be interrupted. In order to avoid such a defect, a further embodiment of this invention is provided wherein the handle of the manual control system is kept from turning while the power is transmitted through the automatic control system to the power shaft, and it is described below.

An embodiment of the power transmission apparatus of this invention in which the handle of the manual control system is kept from turning during the power transmission through the automatic control system to the power shaft is shown in FIG. 8 through FIG. 11.

The apparatus illustrated in FIG. 8 comprises a handle 7, a cylindrical power shaft 6 rotatably held in the case 11, a worm gear 2 having conical holes 21 at four positions adjacent the periphery thereof, a holder 4 fixed to the power shaft 6 and having cylindrical apertures 44 at four positions, and a disc 5 having conical holes 52, 53 at four positions on the periphery thereof as in the apparatus shown in FIG. 6. In this embodiment, however, apertures 441, 442 and 443 are provided in the holder 4 corresponding to the slots 41 and 42 in the foregoing embodiment and the compression springs 81 and 82 are inserted in said apertures 441 and 442.

Figure 11:
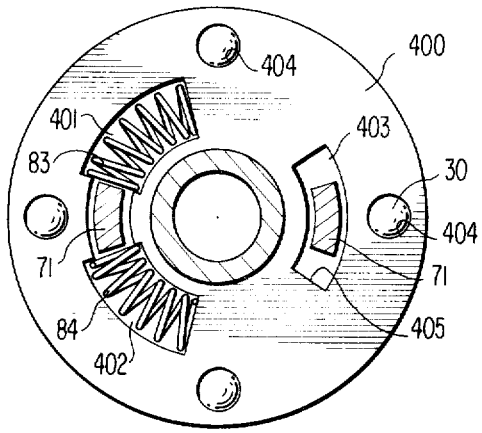

Above said disc 5, there is additionally provided a disc 55 with projection and an upper holder 400 rotatably affixed to the power shaft 6. The disc 55 is provided at the lower portion thereof with a pair of projections 56 opposing to each other, and each of said projections 56 passes through each of two apertures 511 in the disc 5 and extends into an intermediate position between the apertures 441 and 442 and into the apertures 443 in the holder 4. The disc 55 with the projection has conical holes 57 at four positions adjacent the periphery thereof. The upper holder 400 on the upper part provided above the disc 55 and rotatably held to the power shaft 6 has a structure substantially the same as that of the holder 4 shown in FIG. 4, and has cylindrical apertures 404 at four positions thereof capable of aligning with the conical holes 57 in the disc 55. Each of the cylindrical apertures 404 contains two steel balls 30 the sum of their diameters being greater than the thickness of the upper holder 400. As shown in FIG. 11, the upper holder 400 has apertures 401, 402 and 403 and said apertures 401 and 402 contain compression springs 83 and 84 inserted therein. Two projections 71 of the handle 7 are respectively inserted into an intermediate position between the apertures 401 and 402 and in the apertures 403 in said upper holder 400. The lower portion of the handle 7 is provided with conical holes 72 at the positions capable of aligning with the cylindrical apertures 404 provided at the four positions on the upper holder 400. 16 denotes a shaft bearing.

The operation of this apparatus is to be described below. When the power is transmitted through the automatic control system to the power shaft 6, each of the parts of the apparatus takes the state as shown in FIG. 8, and the power from an electric motor, etc. (not shown) is transmitted through the worm gear 1, worm gear 2, steel balls 3, holder 4 and key 50 to the power shaft 6. In this state, the disc 55 with projection rotates together with the holder 4 and the conical holes 57 in the disc 55 and cylindrical apertures 404 in the upper holder 400 may some time align to move the steel balls 30 contained in the cylindrical apertures 404 downward. However, since the handle 7 and the upper holder 400 contact at the outer periphery thereof with an O-ring 14 of a great frictional resistance, they are kept stationary. Accordingly, the steel balls 30 are forced to come out of the conical holes of the disc 55 with projection move upward and engage the conical holes 72 of the handle 7 and, therefore, the rotation of the disc 55 has no effects at all on the handle 7. The handle of the manual control system thus does not turn while the power is transmitted to the power shaft 6 through the automatic control system.

In this embodiment, the power is transmitted through the manual control system to the power shaft in the manner described below. In turning the handle 7 forcedly against the frictional resistance of the O-ring, where the cylindrical apertures 404 in the upper holder 400 and the conical holes 57 in the disc 55 with projection are aligned, the steel balls 30 contained within the cylindrical apertures 404 in the upper holder 400 are pushed out of the conical holes 72 in the handle 7 and moved downward into the conical holes 57 in the disc 55. Where the cylindrical apertures 404 in the upper holder 400 and the conical holes 57 in the disc 55 are not aligned, the turning of the handle 7 causes the upper holder 400 to rotate by the steel balls 30 and brings the cylindrical apertures 404 in the holder 400 to the positions corresponding to the conical holes 57 in the disc 55 to move the steel balls 30 as in the foregoing manner thereby disengaging the connection between the handle 7 and the upper holder 400 formed by the steel balls 30. Now that the upper holder 400 and the disc 55 are connected by way of the steel balls 30, by turning the handle 7, for example, in the direction of an arrow shown in FIG. 11, one of the compression springs inserted in the apertures 401 and 402 in the upper holder 400, for example, the spring 83 is compressed by the projection 71 of the handle 7. When the conical holes 72 of the handle 7 are displaced from the positions corresponding to the cylindrical apertures 404 in the upper holder 400 to the positions where the steel balls 30 can no longer engage within the conical holes 72, or they are displaced so that they are completely out of the alignment with the cylindrical apertures 404 in the upper holder 4, the projection 71 of the handle 7 within one of the apertures 403 in the upper holder 400 comes to contact the end face 405 of the aperture 403. Therefore, by further turning the handle 7, the upper holder 400 is rotated and the rotation of said upper holder 400 is transmitted through the steel balls 30 to the disc 55 with projection.

Figure 9:
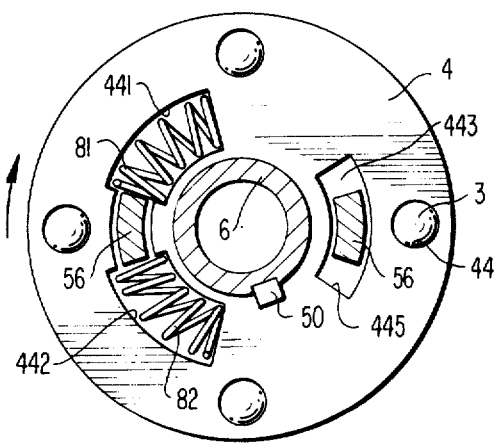
FIG. 9 through FIG. 11 are transverse cross sections taken along the lines A—A, B—B and C—C respectively shown in FIG. 8.
Figure 10:
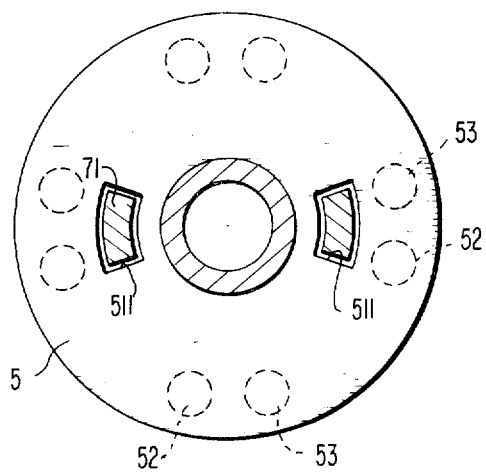

The rotation of the disc 55 with projection causes the disc 5 to rotate by the projections 56 and simultaneously compresses the compression spring 81, for example, in the aperture 441 in the holder 4 when the disc 55 rotates, for example, in the direction of an arrow as shown in FIG. 9. The rotation of the disc 5 brings its conical holes 52 to the positions corresponding to those of the cylindrical apertures 44 in the holder 4 whereby the steel balls 33 in the apertures 44 in the holder 4 are enabled to move up and downward. When the conical holes 52 in the disc 5 and the cylindrical apertures 44 in the holder 4 are aligned, the projection 56 of the disc 55 with projection comes to contact the end face 445 of the apertures 443 in the holder 4. Accordingly, by further turning the handle 7, the holder 4 is rotated by the projection 56 of the disc 55, which rotation is transmitted by way of the key 50 to the power shaft 6. The turning power applied on the handle is, in this way, transmitted sequentially through the projection 71 of the handle 7, upper holder 400, steel balls 30, disc 55 and the projections 56 thereof, holder 4, and key 50 to rotate the power shaft 6. In the above stated condition, the steel balls 3 contained in the cylindrical apertures 44 in the holder 4 are rendered possible to move upward through the cylindrical apertures 44 when the apertures 44 in the holder 4 and the conical holes 52 of the disc 5 are aligned, and said aligning position of the holder 4 and the disc 5 is maintained by the projection 56 of the disc 55. Therefore, the steel balls 3 are expelled upward out of the conical holes 21 in the worm wheel 2 as the holder 4 rotates. The connection formed by the steel balls 3 between the holder 4 and the worm gear 2 is thus eliminated whereby the worm gear 2 rotates idly.

In this embodiment, the handle operation can be performed as described above and, when the operation for the handle 7 is stopped, the function of the automatic control system can be restored automatically and the driving power can again be transmitted through the automatic system to the power shaft 6, in the manner described below.

When the operation on the handle 7 is stopped, the projection 71 of the handle 7 is returned to an intermediate position between the spring 83 compressed in said aperture 401 to provide the alignment between the conical holes 72 in the handle 7 and the cylindrical apertures 404 in the upper holder 400. The steel balls 30 contained in the cylindrical apertures 404 in the upper holder 4 are thereby enabled to move upward and the connection between the upper holder 400 and the disc 55 with projection fromed by the steel balls 30 becomes releasable. If the conical holes 21 in the worm gear 2 are aligned with the cylindrical apertures 44 in the holder 4 in this state, the projection 56 of the disc 55 is turned back to the intermediate position between the apertures 441 and 442 in the holder 4 by the force of the compression spring 81 compressed in said aperture 441 whereby the disc 55 is rotated. The rotation of the disc 55 forces the steel balls 300 contained in the cylindrical apertures 404 in the upper holder 400 to move upward into the engagement with the conical holes 72 in the handle 7. Also, the rotation of the projection 56 of the disc 55 rotates the disc 5 forcing the steel balls 3 contained in the cylindrical apertures 44 in the holder 4 to move downward into engagement with the conical holes 21 in the worm gear 2. The holder 4 and the worm gear 2 are thus connected by the steel balls 3 and the rotation of the worm gear 2 is transmitted to the holder 4. In the case where the conical holes 21 in the worm gear 2 are not aligned with the cylindrical paertures 44 in the holder 4 where the conical holes 72 in the handle 7 and the cylindrical apertures 404 in the upper holder 400 are aligned, at the time of stopping the operation of handle 7 thereby enabling the steel balls 30 to move in said apertures 404 and thus rendering the connection between the disc 55 with projection and the upper holder 400 releasable, the disc 55 with projection is kept its position since the disc 5 and the holder 4 are connected by the steel balls 3. Thereafter, when the worm gear 2 rotates and brings its conical holes 21 to the positions corresponding to those of the cylindrical apertures 44 in the holder 4, the worm wheel 2 and the holder 4 become connected in the same manner as described above.

In this embodiment, the handle 7 of the manual control system can be kept from turning while the power is transmitted to the power shaft 6 through the automatic control system as foregoing. Both of the two control systems can be the automatic control system or the manual control system The apparatus shonw in FIG. 12 is a vertical section of a still further embodiment of this invention wherein, as in the apparatus previously described, the handle is kept from turning while the power is transmitted through the automatic control system to the power shaft and it is further adapted so that the overload applied on the power shaft during the power transmission to the power shaft through the automatic control system can be detected.

Figure 12:
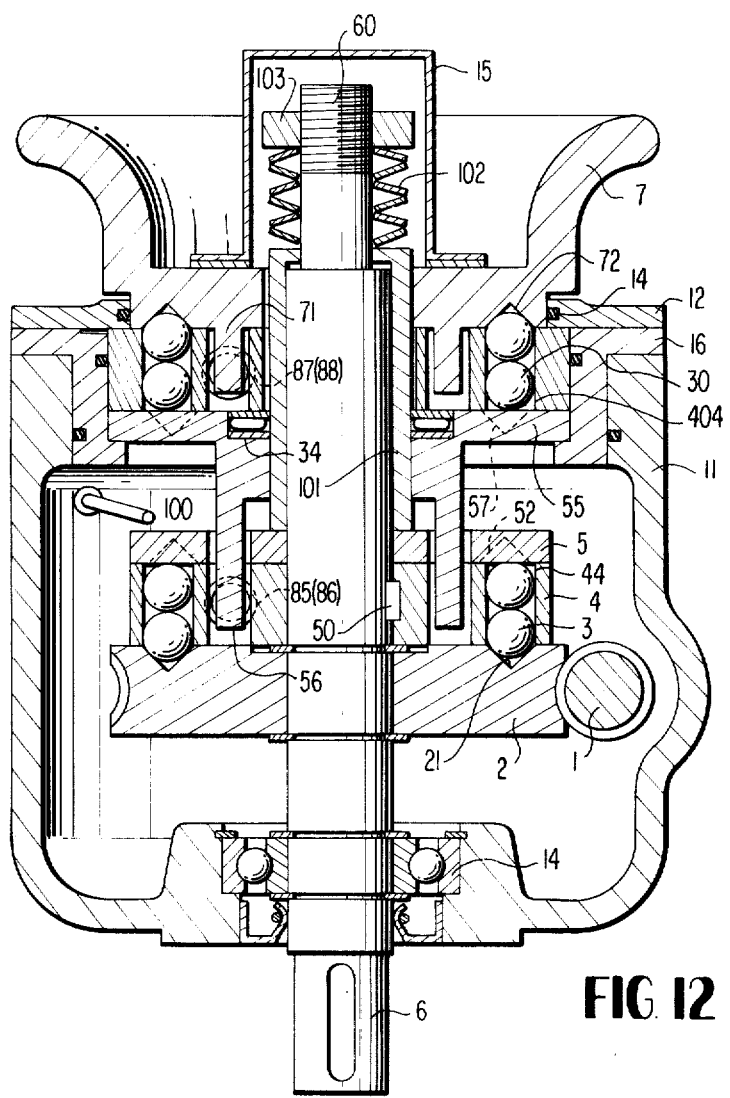
FIG. 12 is a vertical section of a fourth embodiment of this invention.

The apparatus shown in FIG. 12 is substantially the same as that shown in FIG. 8 excepting the following additional provisions for the detection of the overload applied on the power shaft. A gap is formed axially between disc 5 and the disc 55 with projection. The disc 5 is adapted so that it can move axially through said gap and provided on the upper side thereof with a torque detection lever 100 which detects the axial movement of said disc. The power shaft 6 has on its upper end a projection 60 provided with a torque adjusting nut 103 at the upper end thereof. A cylinder 101 movable to the power shaft 6 and having an end extending to the disc 5 is provided in such a way as not hindering the rotation of the handle 7, the upper holder 400 and the disc 55 with projection at all. A torque spring 102 is inserted between the torque adjusting nut 103 and the cylinder 101. 34 denotes a thrust bearing.

The function of this embodiment is now described regarding the detection of the overload applied on the power shaft while the power is transmitted to the power shaft through the automatic control system. Each of the parts of this embodiment takes the state shown in FIG. 12 while the power is transmitted to the power shaft through the automatic control system, and the power is transmitted from the motor, etc. through the worm gear 1, worm gear 2, steel balls 3, holder 4 and key 50 to the power shaft 6. Assuming that some overload is applied on the power shaft 6 to stop its rotation, the stopping of the power shaft 6 stops the rotation of the holder 4 but the worm wheel 2 continues to rotate with the power from the motor, etc. Therefore, the steel balls 3 contained in the cylindrical apertures 44 in the holder 4 are forced to come out of the conical holes 21 in the worm wheel 2 and move upward through the cylindrical apertures 44. The movement of the steel balls 3 raises the disc 5 so that it compresses by way of the cylinder 101 the torque spring 102 having a compression force adjusted previously. The torque detection lever 100 is thus operated by the movement of the disc 100 thereby actuating a switch or the like (not shown) to stop the motor, etc. The overload applied on the power shaft can be detected in such a manner. By removing the overload applied on the power shaft 6 and starting the worm gear 2 again by the motor, etc., the conical holes 21 in the worm gear 2 arrive at the positions aligning with the cylindrical apertures 44 to form connection between the worm gear 2 and the holder 4 with the steel balls 3 whereby the power transmission to the power shaft 6 through the automatic system can be restored.

Also, as in the foregoing embodiments, the precedence can be given for the power transmission to the power shaft by the manual control system rather than the automatic control system by the operation of the handle 7 while the power is transmitted through the automatic system to the power shaft 6, and the power transmission to the power shaft 6 through the automatic control system can be restored automatically when the manual control system is stopped.

What is claimed is:

1. In a power transmission apparatus having both manual and power inputs, means for selecting between the inputs comprising a first worm gear rotatably mounted in an outer housing coupled to a power source; a second worm gear engaging said first worm gear and rotatably mounted about an output shaft, said second worm gear having a plurality of conical intentations therein; a holder slidingly engaging the upper side of said second worm gear and fixedly attached to the output shaft, said holder having at least one cylindrical aperture and a plurality of recesses therein; a disc mounted on said output shaft so as to be rotatably and axially movable with respect thereto, said disc having a plurality of conical indentations and recesses therein; spring means biasing said disc into engagement with said holder; a plurality of balls slidingly retained in each of said apertures in said holder, the sum of the diameter of the balls being greater than the thickness of said holder; a handle rotatably mounted in said outer housing above the disc said handle having projections on its lower portion so as to pass through the recesses in the disc and to be inserted into the recesses in said holder intermediate the sides thereof.

2. A power transmission apparatus as defined in claim 1 wherein means are provided for detecting axial movement of said disc.

* * * * *